(12) United States Patent
Morimoto

(10) Patent No.: US 8,488,621 B2
(45) Date of Patent: Jul. 16, 2013

(54) COMMUNICATION NETWORK SYSTEM AND ERROR VERIFICATION METHOD

(75) Inventor: Kazunori Morimoto, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1266 days.

(21) Appl. No.: 11/774,700

(22) Filed: Jul. 9, 2007

(65) Prior Publication Data
US 2008/0008209 A1    Jan. 10, 2008

(30) Foreign Application Priority Data
Jul. 10, 2006 (JP) .................. 2006-189678

(51) Int. Cl.
 *H04L 12/43* (2006.01)
(52) U.S. Cl.
 USPC .......................................................... 370/458
(58) Field of Classification Search
 USPC .......................................................... 370/458
 See application file for complete search history.

(56) References Cited

U.S. PATENT DOCUMENTS

| | | | | |
|---|---|---|---|---|
| 6,256,477 B1 * | 7/2001 | Eidson et al. | ................. | 455/63.3 |
| 7,492,706 B1 * | 2/2009 | Parrish | ......................... | 370/218 |
| 2002/0099986 A1 * | 7/2002 | Eom | ............................. | 714/707 |
| 2003/0053548 A1 * | 3/2003 | Lee et al. | ....................... | 375/259 |
| 2003/0067873 A1 | 4/2003 | Fuhrmann et al. | | |
| 2004/0192201 A1 * | 9/2004 | Febvre et al. | ................ | 455/13.2 |
| 2005/0131852 A1 | 6/2005 | Berwanger et al. | | |
| 2005/0135416 A1 * | 6/2005 | Ketchum et al. | .............. | 370/469 |
| 2005/0141565 A1 * | 6/2005 | Forest et al. | .................. | 370/503 |
| 2006/0143345 A1 * | 6/2006 | Fredriksson | .................. | 710/106 |

FOREIGN PATENT DOCUMENTS

WO    03/056764 A1    7/2003

OTHER PUBLICATIONS

Ralph Belschner et al., Flexray Requirements Specification, Internet citation (online), May 16, 2002.
"FlexRay Communication System Protocol Specification, Version 2.1, Revision A", Dec. 2005, pp. 204-207.

* cited by examiner

*Primary Examiner* — Mark Rinehart
*Assistant Examiner* — Christopher R Crompton
(74) *Attorney, Agent, or Firm* — Young Basile

(57) ABSTRACT

At least one node on a network acquires boundary violation information and frame state information concerning a reception slot and adjacent slots. Based on the boundary violation information and frame state information concerning the slots, the node verifies an error factor in the reception slot. Based on verification of the error factor, the node determines that data of a frame received in the reception slot can be used. When determining that the data of the received frame can be used, the node uses the received frame for control.

19 Claims, 10 Drawing Sheets

FIG. 4

| RECEPTION STATUS INFORMATION | MEANING | 1 | 0 |
|---|---|---|---|
| ValidFrame | INDICATES WHETHER VALID FRAME HAS BEEN RECEIVED | NORMAL RECEPTION | ABNORMAL RECEPTION |
| SyntaxError | INDICATES WHETHER GRAMMATICALLY CORRECT FRAME HAS BEEN RECEIVED | ABNORMAL RECEPTION | NORMAL RECEPTION |
| ContentError | INDICATES WHETHER CORRECT CONTENT FRAME HAS BEEN RECEIVED | ABNORMAL RECEPTION | NORMAL RECEPTION |
| Bviolation | INDICATES WHETHER BOUNDARY VIOLATION HAS OCCURRED AT ONE SLOT BOUNDARY | VIOLATION | NO VIOLATION |

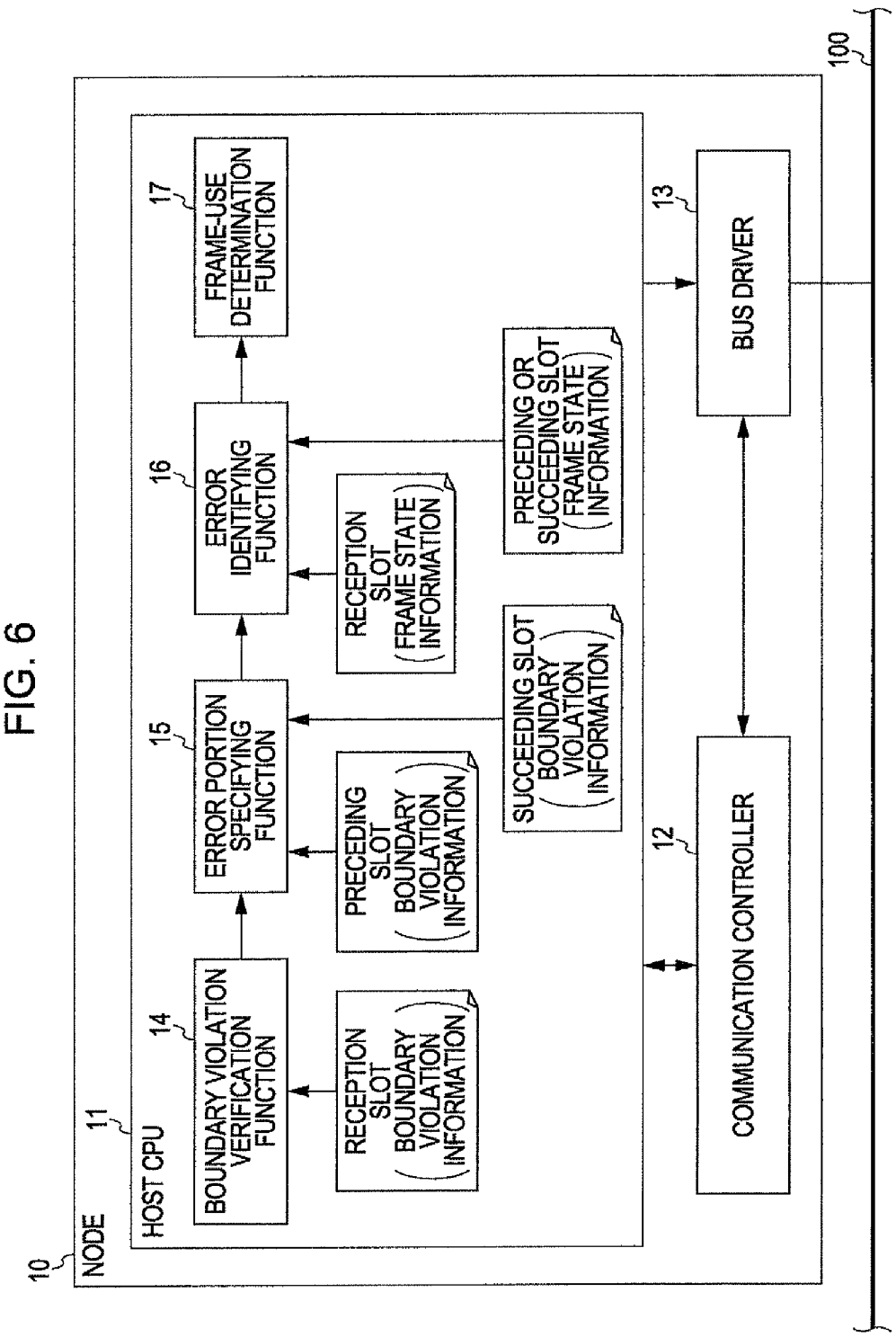

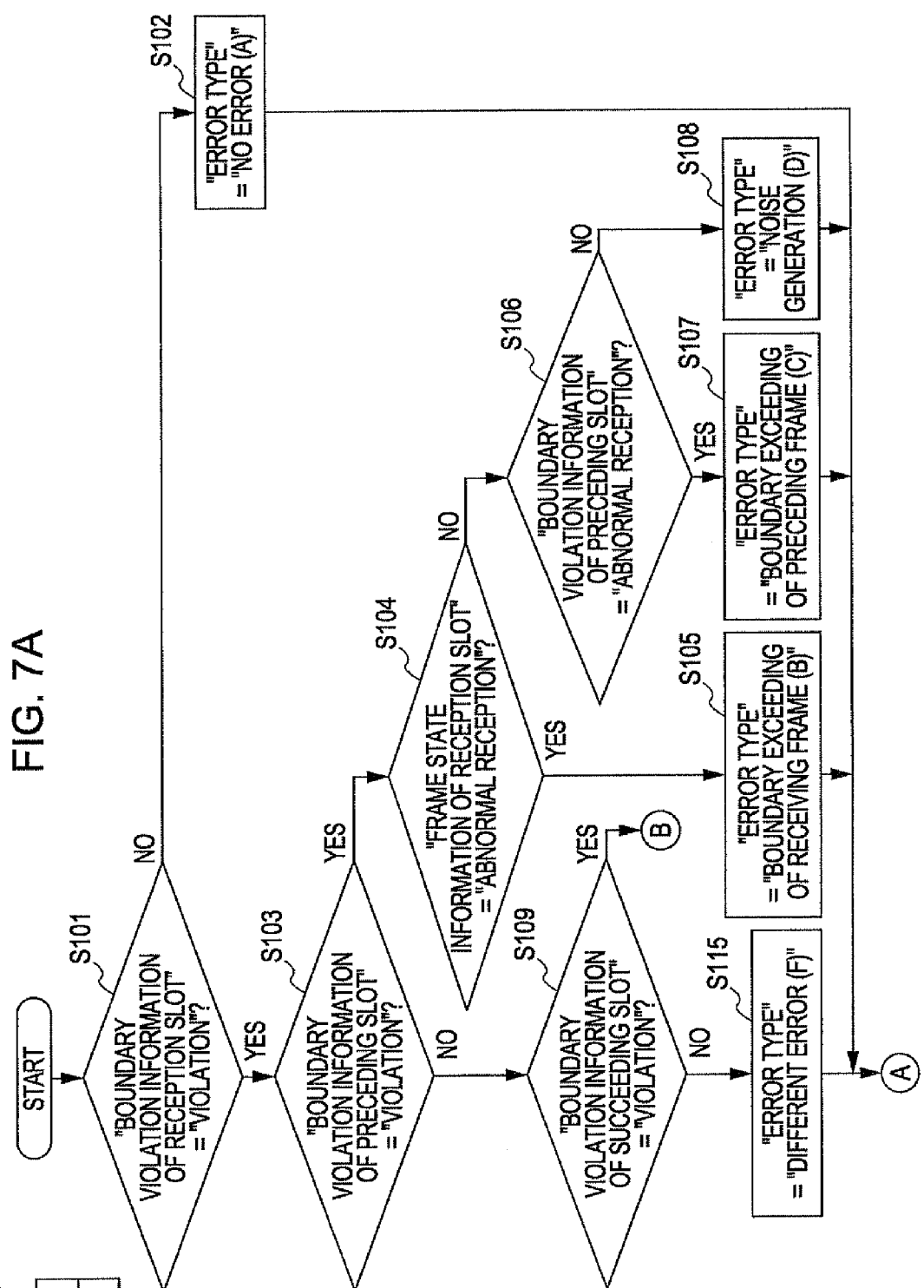

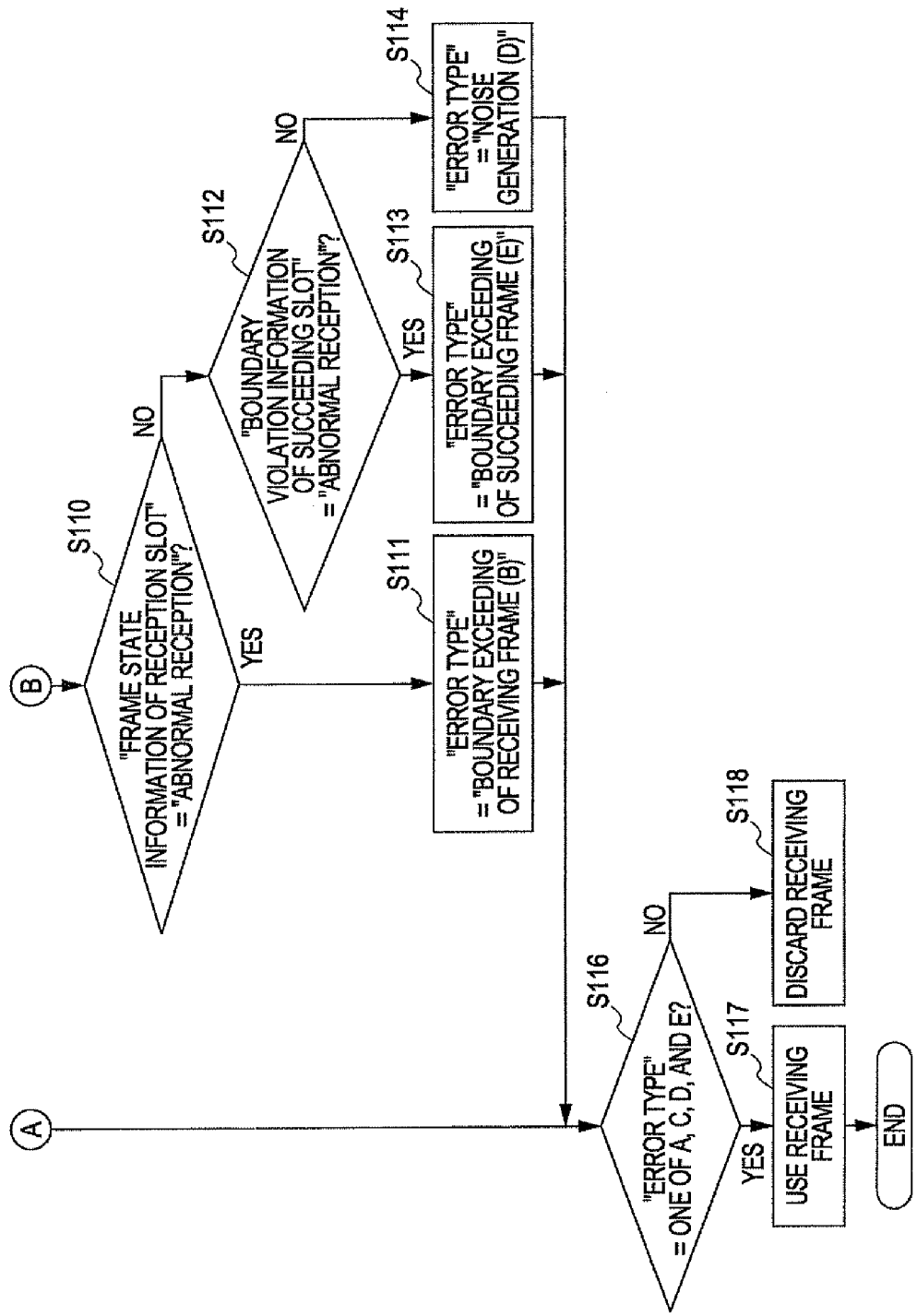

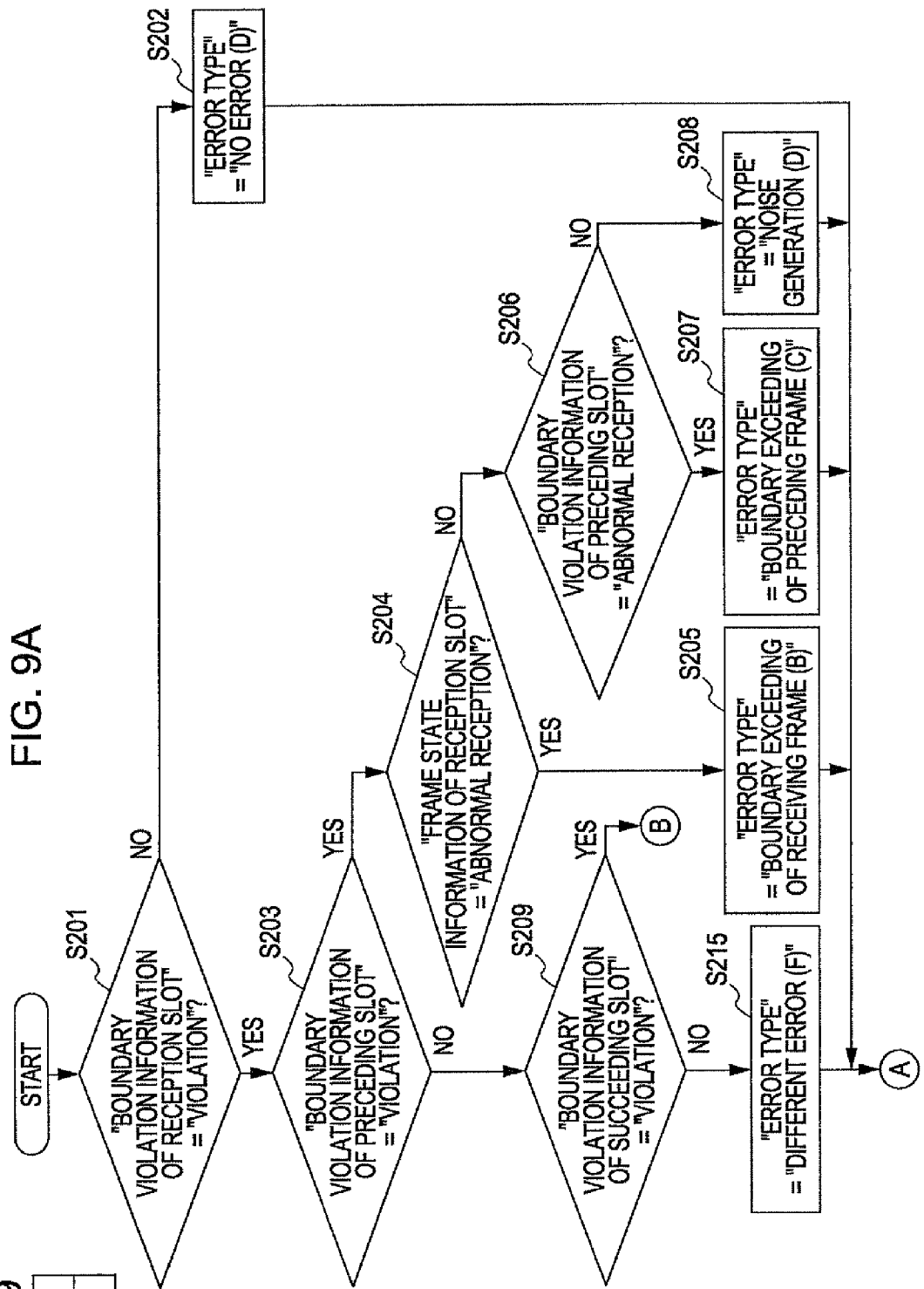

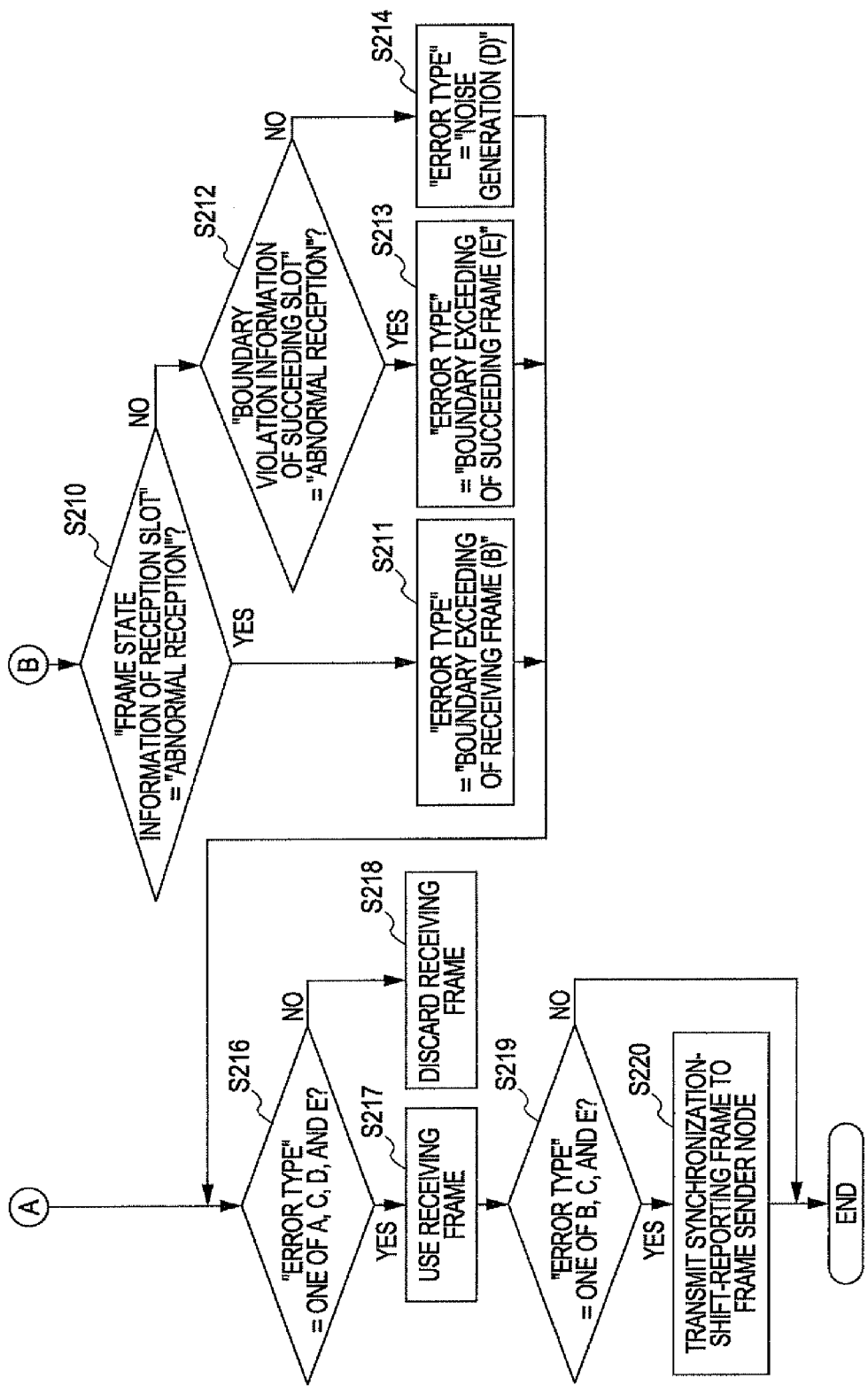

COMMUNICATION NETWORK SYSTEM AND ERROR VERIFICATION METHOD

CROSS-REFERENCE TO RELATED APPLICATION

This application claims priority from Japanese Patent Application Serial No. 2006-189678, filed Jul. 10, 2006, which is incorporated herein in its entirety by reference.

TECHNICAL FIELD

The invention relates in general to a time-division-multiplexing communication network system.

BACKGROUND

A communication protocol called "FlexRay" (trademark of Daimler Chrysler AG) is known as a type of protocol for a communication network system installed in a vehicle. FlexRay realizes a communication speed of a maximum of approximately 10 Mbps (megabits per second) while ensuring high reliability. FlexRay has attracted attention as an important technology for practicing electronic control (X-by-wire) of a portion related to vehicle running.

In FlexRay, a time trigger method is employed as a data transfer method, and frame transmission timing and frame receiving timing of each of nodes on a network are scheduled beforehand. In FlexRay, so-called "communication cycles" are used. One communication cycle defines a static segment in which each slot that is a time interval for transmitting a frame has a fixed length, and a dynamic segment in which each slot has a variable length. In FlexRay, each node on the network recognizes timing of each slot assigned to the node in the static segment and dynamic segment in each communication cycle in accordance with a global time that is common time recognition in the network, and that node transmits a frame to be transmitted to a different node in the slot. In addition, the node recognizes timing of each slot assigned for transmitting a frame to be received by the node and receives a frame transmitted from the different node in the slot. When each node on the network receives the frame transmitted from the different node, the node acquires reception status information representing a frame reception state in the slot, and, on the basis of the reception status information, checks whether to normally receive the frame.

BRIEF SUMMARY

Embodiments of a communication network system and method for communicating over a network are taught herein. According to one communication network system for performing time-division-multiplexing communication in which a frame is received in a reception slot to be received by a node in a communication cycle including a data transfer period and an idle period, the communication network system comprises a network and a plurality of nodes coupled to the network. At least one node of the plurality of nodes includes a reception-status-information acquiring unit configured to acquire boundary violation information concerning a reception slot to be received by the node and at least one adjacent slot adjacent to the reception slot and to acquire frame state information concerning each of the reception slot and the at least one adjacent slot; an error-factor verifying unit configured to verify an error factor of the reception slot based on the boundary violation information and the frame state information; and a frame-use determining unit configured to determine whether data of a frame received in the reception slot is usable based on a result of verification by the error-factor verifying unit and configured to use the frame for control when the data of the frame is usable.

BRIEF DESCRIPTION OF THE DRAWINGS

The description herein makes reference to the accompanying drawings wherein like reference numerals refer to like parts throughout the several views, and wherein:

FIG. 4 an illustration of contents of reception status information obtained when a frame is received;

FIGS. 5A, 5B, 5C, 5D, 5E and 5F are illustrations of factors by which boundary violation information concerning reception slots represents "violation" in which FIG. 5A shows a state in which a received frame shifts back to cross a preceding slot boundary, FIG. 5B shows a state in which a receiving frame shifts front to cross a succeeding slot boundary, FIG. 5C shows a state in which a preceding frame shifts front to cross a preceding slot boundary, FIG. 5D shows a state in which a succeeding frame shifts back to cross a succeeding slot boundary, FIG. 5E shows a state in which momentary noise is generated at a preceding slot boundary and FIG. 5F shows a state in which momentary noise is generated at a preceding slot boundary;

FIG. 6 is a block diagram showing the configuration of a node as a first example;

FIG. 7 is a flowchart showing a sequential process that is executed by a host CPU in the node as the first example;

FIG. 9 is a flowchart showing a sequential process that is executed by a host CPU in the node according to a second embodiment.

DETAILED DESCRIPTION OF EMBODIMENTS OF THE INVENTION

Figure 1:
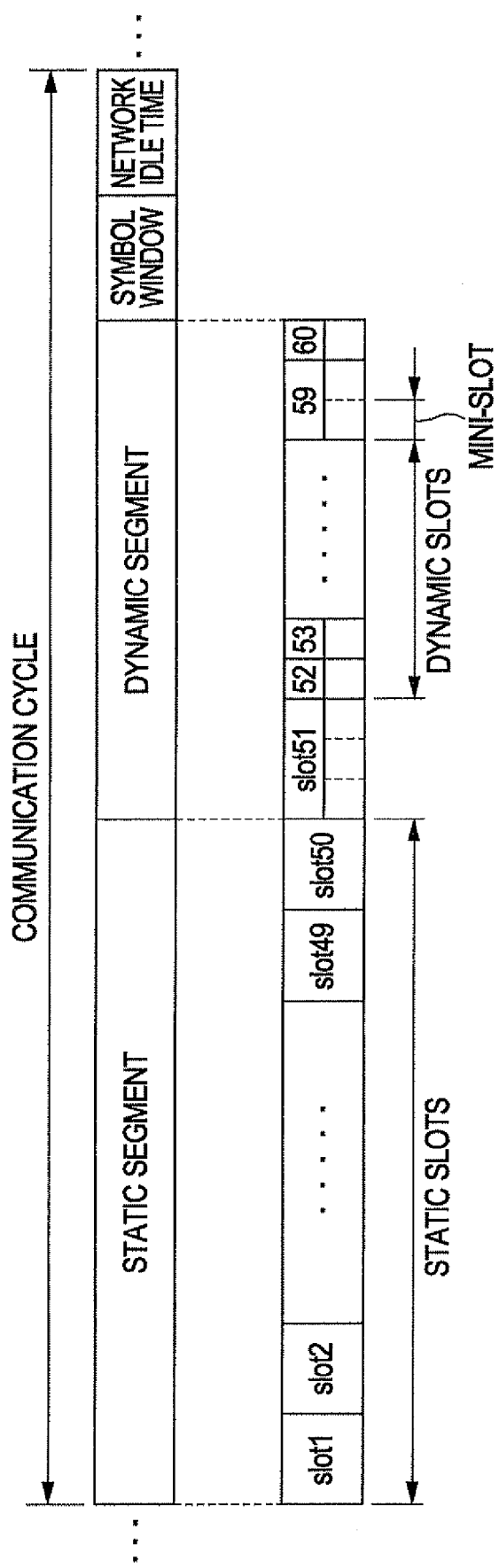
FIG. 1 is an illustration of a mechanism of data transfer in the FlexRay protocol.

In the above-described communication in FlexRay, as long as all the nodes on the network perform frame transmission and reception while correctly recognizing the global time, all frames that are transmitted and received among the nodes are accommodated in corresponding slots, and each boundary between the slots comes to be in an idle state having no signal component. However, if a time recognition shift (synchronization shift) occurs in one node among the nodes on the network, a frame that is transmitted from that node crosses a slot boundary that is recognized by the different node. Accordingly, a signal component may be detected at the slot boundary. In this case, when a different node receives a frame from the node in which the synchronization shift occurs, the different node acquires reception status information representing a boundary violation. After the different node acquires the reception status information representing the boundary violation, the different node discards the received frame without allowing an application of the different node to use data of received frame. In other words, both frames in which the boundary violation occurs are discarded. Details of the reception status information in FlexRay are described in "FlexRay Communication System Protocol Specification, Version 2.1, Revision A", December 2005, pages 204-207, which is herein incorporated by reference.

The above reception status information representing the occurrence of a boundary violation error is output such that the signal component is detected at the slot boundary. Thus, regardless of in which of two adjacent slots across the slot boundary that the shift occurs, the reception status information is similarly acquired by both slots. In addition, in this case, both frames in which the boundary violation occurs are discarded. Therefore, although a receiving node receives a correct frame, the receiving node cannot use data of the received frame in an application of the receiving node, thus causing a decrease in efficiency.

In contrast, this disclosure provides a communication network system for realizing efficient communication by accurately identifying an error factor represented by reception status information and appropriately responding to the error factor. The communication network system can include acquiring boundary violation information and frame state information concerning each of a reception slot and adjacent slots by each of nodes on a network, verifying an error factor of the reception slot on the basis of the boundary violation information and frame state information concerning each of the slots, determining whether or not data of a frame received in the reception slot is usable on the basis of the result of verification of the error factor, and, if it is determined that the data of the received frame is usable, using the received frame for control.

Accordingly, based of the result of verification of an error factor, it is determined whether data of a frame received in a reception slot can be used. If it is determined that the received frame is usable, the received frame is used for control. Thus, regardless of reception of a correct frame, efficient communication is realized without discarding the frame.

An example in which the invention is applied to an in-vehicle communication network system employing FlexRay as a communication protocol is described in embodiments below. In the communication network system according to the embodiments, a plurality of electronic control units (ECUs) for controlling an in-vehicle electric system have communication functions, and the ECUs are connected as nodes on a network to a FlexRay bus. The ECUs share information by communicating with one another in accordance with a FlexRay protocol, whereby the communication network system realizes various types of control based on cooperative operations of the ECUs. As is known in the art, such ECUs generally comprises microcontrollers or the like.

FIG. 1 shows an outline of a data transfer mechanism in FlexRay employed as the communication protocol in such a communication network system. The FlexRay data transfer method is a time trigger method in which each node on the network transmits frames with transmitting timing scheduled beforehand. Data transfer between the nodes is performed by using, as each unit, a communication cycle that is repeated while the communication network system is operating. As shown in FIG. 1, the communication cycle includes four segments, a static segment, a dynamic segment, a symbol window and a network idle time.

The static segment is a period in which data transfer is performed with a constant frame size and includes a plurality of static slots. One static slot is a time interval (band) in which one frame is transmitted in one static segment. The times of all the static slots are equal, and the lengths of frames transmitted in the slots are also equal. In the static segment, each node on the network performs communication only in accordance with a predetermined schedule.

The dynamic segment is a period in which data transfer is performed with a variable frame size and includes a plurality of dynamic slots. One dynamic slot is a time interval in which one frame is transmitted in the dynamic segment, and the length of the dynamic slot can be changed on the basis of a transmission request of each node on the network. In the dynamic segment, the node on the network can perform communication in accordance with priority.

The symbol window is a segment that is used in modes such as a network startup mode and a wakeup mode. In addition, the network idle time is a segment that is used for purposes such as error correction and synchronization correction value calculation. The dynamic segment and symbol window in the above communication cycle are set as options and may not be necessary depending on the configuration and use of the communication network system.

Figure 2:
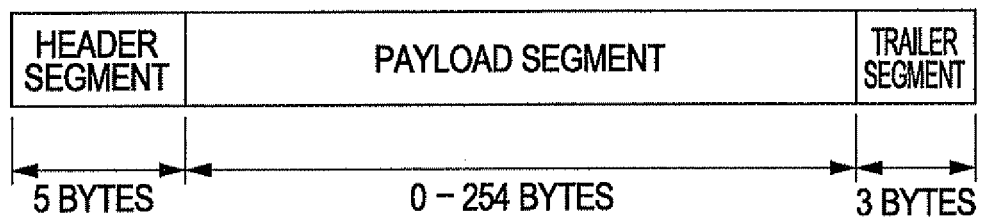
FIG. 2 is an illustration of a frame format in the FlexRay protocol.

FIG. 2 shows an outline of a FlexRay frame format. As shown in FIG. 2, such a FlexRay frame includes three segments, a header segment (5 bytes), a payload segment (0 to 254 bytes) and a trailer segment (3 bytes). The header segment contains header information concerning data to be transmitted, and the payload segment contains the data itself. The trailer segment has a function of checking whether the entire frame has an error, and the trailer contains the result of performing a cyclic redundancy check (CRC) on the header segment and the payload segment.

Figure 3:
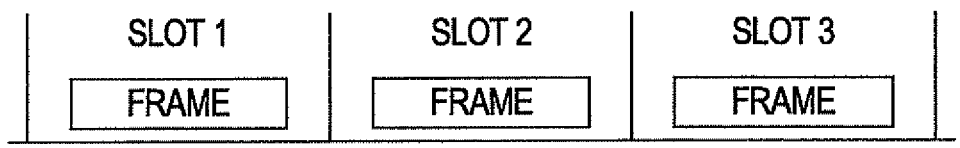
FIG. 3 is an illustration of reception of frames in slots in a state with sufficient slot boundaries provided between slots.

In accordance with a global time that is common time recognition in the network, each node on the network recognizes, in the static segment and dynamic segment of the above communication cycle, slots assigned as frame transmission periods of the node. Each node transmits, in the slots, frames each having the above format and including application data of the node. The sizes of the slots can be set to lengths in which the frames to be transmitted can sufficiently be accommodated. As schematically shown in FIG. 3, the node on the network transmits the frames in the slots with sufficient slot boundaries provided between the frames. In other words, in each slot in the communication cycle idle periods are provided before and after a frame to be transmitted in the slot and a slot boundary between an interframe idle period and an adjacent slot is in an idle state having no signal component.

In addition, in accordance with the global time that is common time recognition in the network, each node on the network recognizes, in the static segment and dynamic segment in the above communication cycle, slots (hereinafter referred to as "reception slots") assigned for transmitting frames to be received by the node. Each node receives, in these reception slots, frames transmitted by a different node. At this time each node acquires reception status information representing an in-slot frame reception state, specifically the pieces of reception status information shown in FIG. 4. Based on the pieces of reception status information, the node performs diagnosis about whether frames have normally been received from the different node. Among the pieces of reception status information shown in FIG. 4, "ValidFrame" indicates whether or not a valid frame has been received, "SyntaxError" indicates whether or not a grammatically correct frame has been received, and "ContentError" indicates whether or not a correct content frame has been received. All are pieces of information representing in-slot frame normality. In the following description, the above pieces of reception status information are generically referred to as "pieces of frame state information." In addition, "Bviolation" indicates whether or not a boundary violation has occurred at one slot boundary and is a piece of information that is set to "violation" when a signal component is detected at the slot boundary. This piece of information is hereinafter referred to as "boundary violation information."

When each node on the network receives a frame in a reception slot, and a piece of frame state information obtained by the reception slot represents "abnormal reception," the node can determine that an error occurs in the frame itself. Accordingly, the node discards data of the received frame without allowing an application of the node to use the data. The six cases shown in FIGS. 5A to 5F are possible as factors of the "violation" where among the pieces of reception status information obtained when the node receives a frame in the reception slot, the boundary violation information represents "violation." It is not possible to identify which of the cases in FIGS. 5A to 5F occurs only on the basis of the boundary violation information concerning the reception slot.

Figure 5A:
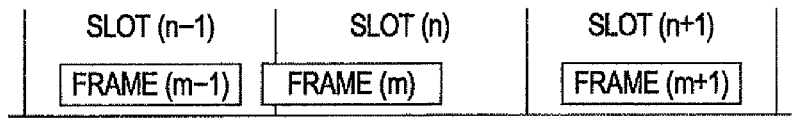

Specifically, FIG. 5A shows a case in which, when a node receives frame(m) in reception slot(n), frame(m) is transmitted crossing a slot boundary between reception slot(n) and a preceding slot(n−1) adjacent to reception slot(n). This is due to a cause such as a synchronization shift of a sender node of frame(m). In this case, a communication-bus voltage change (signal component) is detected at this slot boundary, whereby the boundary violation information is set to represent "violation."

Figure 5B:
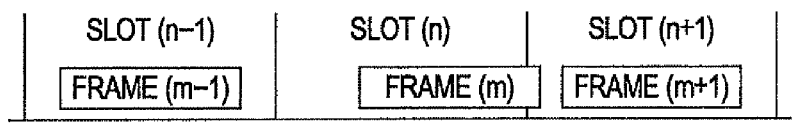

FIG. 5B is a case in which, frame(m) is transmitted crossing a slot boundary between reception slot(n) and succeeding slot(n+1) adjacent to reception slot(n) when a node receives frame(m) in reception slot(n). This is also due to a cause such as a synchronization shift of a sender node of frame(m). In this case, a communication-bus voltage change (signal component) is detected at this slot boundary, whereby the boundary violation information is set to represent "violation."

Figure 5C:
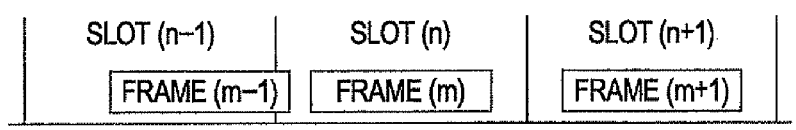

In addition, FIG. 5C illustrates a case in which, frame(m−1) is transmitted crossing a slot boundary between reception slot(n) and preceding slot(n−1) adjacent to reception slot(n) when a node receives frame(m) in reception slot(n). This is due to a case such as a synchronization shift of a sender node of frame(m−1) in preceding slot(n−1) adjacent to reception slot(n). Then, a communication-bus voltage change (signal component) is detected at this slot boundary, whereby the boundary violation information is set to represent "violation."

Figure 5D:
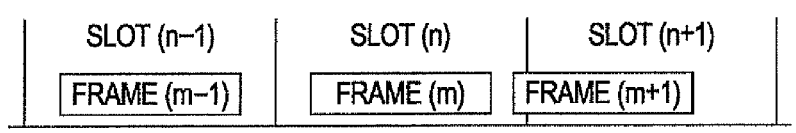

In addition, FIG. 5D shows a case wherein, when a node receives frame(m) in reception slot(n), frame(m+1) is transmitted crossing a slot boundary between reception slot(n) and succeeding slot(n+1) adjacent to reception slot(n). This is due to a cause such as a synchronization shift of a sender node of frame(m+1) in succeeding slot(n+1) adjacent to reception slot(n). Then a communication-bus voltage change (signal component) is detected at this slot boundary, whereby the boundary violation information is set to represent "violation."

Figure 5E:
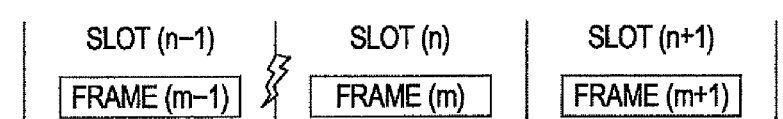

FIG. 5E illustrates a case wherein when a node receives frame(m) in reception slot(n), momentary noise is generated at a slot boundary between reception slot(n) and preceding slot(n−1) adjacent to reception slot(n). In this case, a communication-bus voltage change (signal component) is detected at this slot boundary, whereby the boundary violation information is set to represent "violation."

Figure 5F:
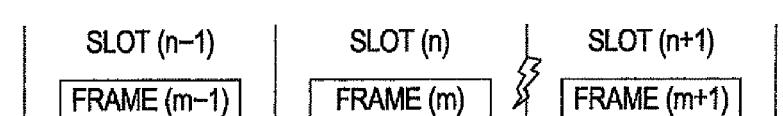

Finally, FIG. 5F illustrates a case wherein when a node receives frame(m) in reception slot(n), momentary noise is generated at a slot boundary between reception slot(n) and succeeding slot(n+1) adjacent to reception slot(n). In this case, a communication-bus voltage change (signal component) is generated at this slot boundary, whereby the boundary violation information is set to represent "violation."

Among the boundary violation causing factors shown in FIGS. 5A to 5F, the factors in FIGS. 5A and 5B are errors of the received frames themselves, and data items of the received frames are not used by applications. The factors in FIGS. 5C to 5F are malfunctions of different frames transmitted in adjacent slots and the effects of noise. Accordingly, the factors in FIGS. 5C to 5F are not malfunctions of the received frames themselves. Thus, the data items of the received frames can be used by the nodes. However, each of the above-described cases in FIGS. 5A to 5F cannot be identified only on the basis of the boundary violation information concerning the reception slot. Thus, even if the boundary violation information that represents "violation" is acquired on the basis of one of the factors in FIGS. 5C to 5F, data of a frame received by a node is discarded without being used by an application of the node. This causes a decrease in efficiency.

Accordingly, in the communication network system taught herein, each node on the network receives not only a frame in a reception slot but also frames in slots adjacent to the frame in the reception slot. That is, the node can acquire frames in three slots including the reception slot and two slots adjacent to the reception slot. In addition, by verifying whether an error occurs in the reception slot and verifying an error factor on the basis of the reception status information concerning the three slots, for example, when the boundary violation information in the reception slot represents "violation," it can be identified which of the above-described cases in FIGS. 5A to 5F causes the factor of the "violation." In this manner, appropriate responses can be achieved. Specifically, for each of the cases in FIGS. 5A and 5B data of the received frame is discarded, and for each of the cases in FIGS. 5C to 5F data of a frame received by a node is used by an application of the node.

Next, a first example of a node included in the communication network system according to an embodiment of the invention is described with reference to FIGS. 6 and 7.

As shown in FIG. 6, a node 10 is an ECU having an internal configuration of hardware including a host central processing unit (CPU) 1, a communication controller 12 and a bus driver 13. The host CPU 11 is a controller for controlling operations of the entirety of the node 10, and the communication controller 12 is a controller for controlling communication of the node 10. The bus driver 13 is used for signal conversion between a physical signal and a logical signal between a communication bus 100 and the communication controller 12. The node 10 is connected to other nodes through the communication bus 100.

When the node 10 receives frames sent from a different node to the communication bus 100, the node 10 performs frame receiving processing under the control of the communication controller 12. This frame receiving processing occurs not only in a reception slot containing a frame (hereinafter referred to as a "receiving frame") to be received by the node 10, but also occurs in preceding and succeeding slots adjacent to the reception slot, whereby reception status information (boundary violation information and frame state information) of each of the three slots, that is, the preceding slot, the reception slot and the succeeding slot, is acquired. An adjacent slot before the reception slot is hereinafter referred to as the "preceding slot," and an adjacent slot after the reception slot is hereinafter referred to as the "succeeding slot." Next, based on the reception status information of each of the three slots, the host CPU 11 verifies whether an error occurs in the reception slot and verifies a factor of the error. Based on the result of the verification, the host CPU 11 can determine whether data of the received frame is to be used by an application of the node 10.

More specifically, the node 10 has a boundary violation verification function 14, an error portion specifying function 15, an error identifying function 16 and a frame-use determination function 17 as functions of the host CPU 11 realized by software, can be implemented in hardware, or can be implemented in a combination of hardware and software.

The boundary violation verification function 14 verifies whether boundary violation occurs at one of slot boundaries before and after the reception slot. The boundary violation verification function 14 verifies boundary violation of the reception slot on the basis of boundary violation information that is acquired when the communication controller 12 performs frame receiving processing in the reception slot.

The error portion specifying function 15 is used to specify at which slot boundary the boundary violation occurs when the boundary violation verification function 14 determines that the boundary violation occurs at one of slot boundaries before and after the reception slot. Based on the boundary violation information acquired when the communication controller 12 performs receiving processing on a frame in the preceding slot (hereinafter referred to as a "preceding frame"), and the boundary violation information acquired when the communication controller 12 performs receiving processing on a frame in the succeeding frame (hereinafter referred to as a "succeeding frame"), the error portion specifying function 15 specifies a slot boundary at which the boundary violation occurs.

The error identifying function 16 identifies an error factor of the boundary violation that occurs at the slot boundary specified by the error portion specifying function 15. Error factors of the boundary violation include boundary exceeding of the received frame, boundary exceeding of the preceding frame, boundary exceeding of the succeeding frame and noise generation, When the error portion specifying function 15 specifies a slot boundary between the reception slot and the preceding slot as the slot boundary at which the boundary violation occurs, the error identifying function 16 identifies which of the above-described cases is the error factor of the boundary violation based on the frame state information acquired when the communication controller 12 performs receiving processing on the preceding frame in the preceding slot and the frame state information acquired when the communication controller 12 performs receiving processing on the receiving frame in the reception slot. In addition, when the error portion specifying function 15 specifies a slot boundary between the reception slot and the succeeding slot as the slot boundary at which the boundary violation occurs, the error identifying function 16 identifies which of the above-described cases is the error factor of the boundary violation based on the frame state information acquired when the communication controller 12 performs receiving processing on the receiving frame in the reception slot and the frame state information acquired when the communication controller 12 performs receiving processing on the succeeding frame in the succeeding slot.

The frame-use determination function 17 determines whether or not the data of the receiving frame can be used by an application of the node 10 based on the error factor of the boundary violation identified by the error identifying function 16. When the error factor of the boundary violation identified by the error identifying function 16 is one of the boundary exceeding of the preceding frame, the boundary exceeding of the succeeding frame and the noise generation, the frame-use determination function 17 determines that data of the receiving frame can be used by the application of the node 10 since the identified error factor is not a malfunction of the receiving frame itself. In addition, when the error factor of the boundary violation identified by the error identifying function 16 is either boundary exceeding of the receiving frame or a different factor (such as a malfunction of the communication controller 12), the frame-use determination function 17 determines that the data of the receiving frame cannot be used by the application of the node 10 since an error occurs or is likely to occur in the receiving frame itself.

FIGS. 7A and 7B are flowcharts showing a sequential process that executes each function of the host CPU 11 in the node 10 in this embodiment. Processing of the host CPU 11 is described in accordance with the flowcharts shown in FIGS. 7A and 7B and is repeatedly executed by the host CPU 11 whenever the communication controller 12 performs receiving processing on the receiving, preceding and succeeding frames, and the reception status information (boundary violation information and frame state information) concerning the reception, preceding and succeeding slots is acquired.

When the process in FIGS. 7A and 7B is started, the host CPU 11 confirms whether the boundary violation information concerning the reception slot represents "violation" in step S101. If the boundary violation information concerning the reception slot represents "no violation," the host CPU 11 sets an error type to "no error (type A)" in step S102. The error type is information identifying an error factor of the boundary violation of the reception slot.

Alternatively, if the boundary violation information concerning the reception slot represents "violation" in step S101, the host CPU 11 confirms whether the boundary violation information concerning the preceding slot represents "violation" in step S103. If it is confirmed in step S103 that the boundary violation information concerning the reception slot represents "violation," the boundary violation occurs at the slot boundary between the reception slot and the preceding slot. Thus, in step S104 the host CPU 11 confirms whether the frame state information concerning the reception slot represents "abnormal reception." If the frame state information concerning the reception slot represents "abnormal reception," the host CPU 11 sets the error type to "boundary exceeding of the receiving frame (type B)" in step S105. If the reception status information concerning the reception slot does not represent "abnormal reception" in step S104, the host CPU 11 confirms whether the frame state information of the preceding slot represents "abnormal reception" in step S106. If it is confirmed that the frame state information of the preceding slot represents "abnormal reception" in step S106, the host CPU 11 sets the error type to "boundary exceeding of the preceding frame (type C)" in step S107. Alternately, if it is confirmed that the frame state information of the preceding slot does not represent "abnormal reception" in step S106, the host CPU 11 sets the error type to "noise generation (type D)" in step S108.

Returning to step S103, if it is confirmed that the boundary violation information concerning the preceding slot does not represent "violation," the host CPU 11 confirms whether the boundary violation information concerning the succeeding slot represents "violation" in step S109. If it is confirmed that the boundary violation information concerning the succeeding slot represents "violation" in step S109, it is determined that the boundary violation occurs at the slot boundary between the reception slot and the succeeding slot. Thus, in step S110, the host CPU 11 confirms whether the frame state information concerning the reception slot represents "abnormal reception." If the frame state information concerning the reception slot represents "abnormal reception" in step S110, the host CPU 11 sets the error type to "boundary exceeding of the receiving frame (type B)" in step S111. However, if it is confirmed that the frame state information concerning the reception slot does not represent "abnormal reception" in step S110, the host CPU 11 confirms whether the frame state information of the succeeding slot represents "abnormal reception" in step S112. In step S112, if it is confirmed that the frame state information of the succeeding slot represents "abnormal reception," the host CPU 11 sets the error type to "boundary exceeding of the succeeding slot (type E)" in step S113. Alternately, if it is confirmed that the frame state information of the succeeding slot does not represent "abnormal reception" in step S112, the host CPU 11 sets the error type to "noise generation (type D)" in step S114.

Returning to step S109, if it is confirmed that the boundary violation information concerning the succeeding slot does not represent "violation," the slot boundary at which the boundary violation occurs cannot be specified. For example, it is possible that the boundary violation occurs due to a different factor such as malfunction of the communication controller 12. In this case, the host CPU 11 sets the error type to "different error (type F)" in step S115.

After the error type is set in any of steps S115, S105, S107, S108, S102, S111, S113 and S114, the host CPU 11 confirms the error type in step S116. When the error type is one of "no error (type A)," "boundary exceeding of the preceding frame (type C)," "noise generation (type D)" and "boundary exceeding of the succeeding frame (type B)," the host CPU 11 determines that the receiving frame itself has no malfunction in step S117 and allows the application of the node 10 to use the data of the receiving frame. Alternatively, when the error type is either "boundary exceeding of the receiving frame (type B)" or "different error (type F)", the host CPU 11 determines that an error occurs or is likely to occur in the receiving frame itself and discards the data of the receiving frame without allowing the application of the node 10 to use the data.

Next, a second example of the node included in the communication network system according to embodiments of the invention is described below with reference to FIGS. 8 and 9.

Figure 8:
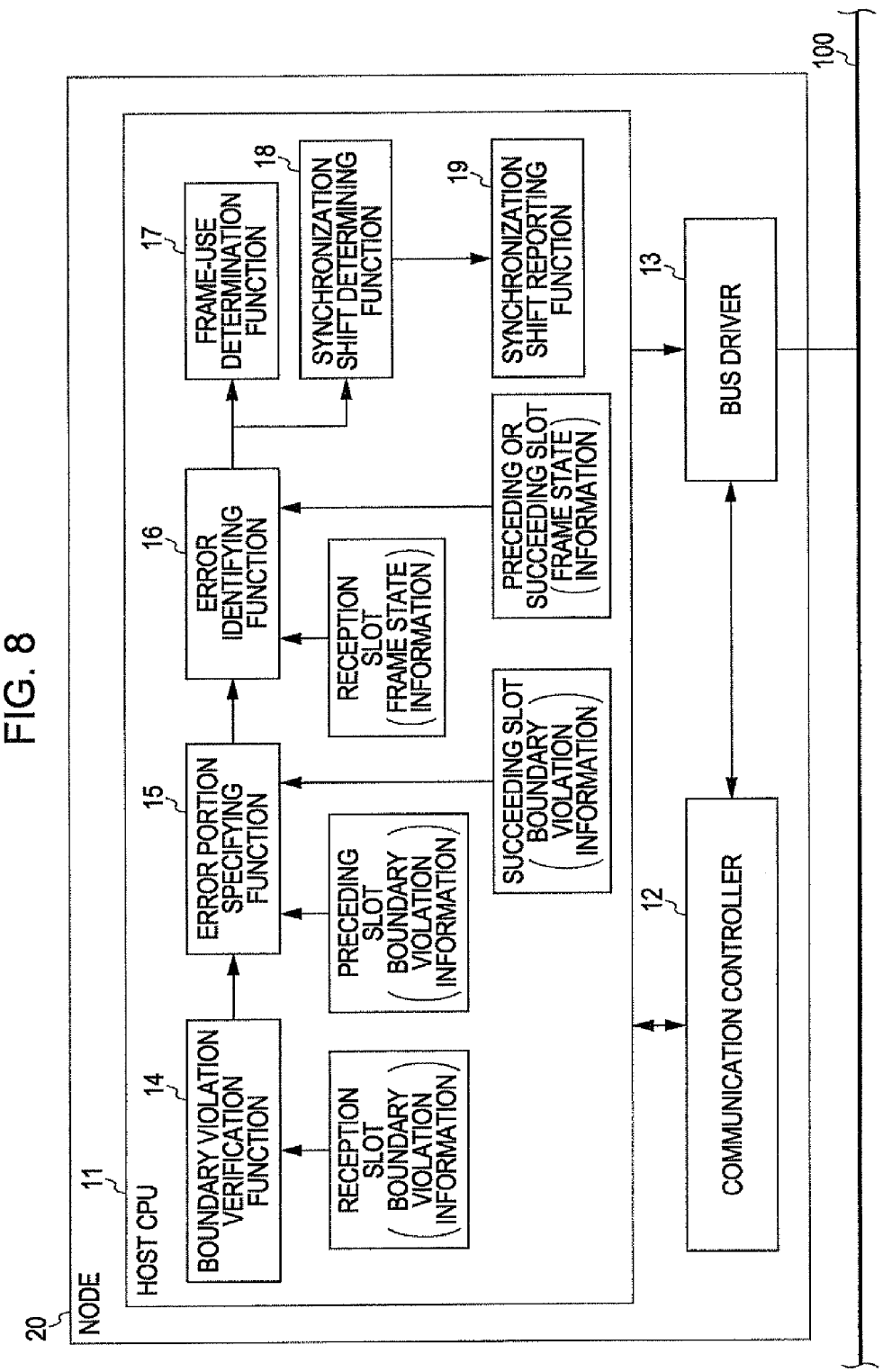
FIG. 8 is a block diagram showing the configuration of a node as a second example.

As shown in FIG. 8, a node 20 has a synchronization shift determining function 18 and a synchronization shift reporting function 19 in addition to the boundary violation verification function 14, the error portion specifying function 15, the error identifying function 16 and the frame-use determination function 17. These functions can be implemented in hardware, software run by the host CPU 11 or a combination of hardware and software. Other components are common to those of the node 10 in the first example and are accordingly not described again.

In the node 20, the result of identifying performed by the error identifying function 16 is used not only in the frame-use determination function 17 but also in the synchronization shift determining function 18. The synchronization shift determining function 18 determines, based on an error factor of boundary violation identified by the error identifying function 16, whether a node in which a synchronization shift occurs is detected (that is, the node being included in sender nodes of frames). When the error factor of the boundary violation identified by the error identifying function 16 is boundary exceeding of the receiving frame, the synchronization shift determining function 18 determines that a synchronization shift occurs in the sender node of the receiving frame. When the error factor of the boundary violation identified by the error identifying function 16 exceeds the boundary of the preceding frame, the synchronization shift determining function 18 determines that a synchronization shift occurs in a sender node of the preceding frame. When the error factor of the boundary violation identified by the error identifying function 16 exceeds the boundary of the succeeding frame, the synchronization shift determining function 18 determines that a synchronization shift occurs in a sender node of the succeeding frame.

When the synchronization shift determining function 18 determines that the synchronization shift occurs in the sender node of the receiving frame, the sender node of the preceding frame or the sender node of the succeeding frame, the synchronization shift reporting function 19 reports the occurrence of the synchronization shift to the sender node. In the synchronization shift reporting function 19, for example, a synchronization-shift-reporting frame for reporting the occurrence of a synchronization shift is prepared. When the synchronization shift determining function 18 specifies a node in which a synchronization shift occurs, the synchronization-shift-reporting frame is transmitted in a predetermined slot as a slot in which the node performs receiving processing. A technique for reporting a synchronization shift to a sender node of a frame in which boundary exceeding occurs is not limited to the above-exemplified technique, but various techniques can be used.

FIGS. 9A and 9B are flowcharts showing a sequential process that is executed by each function of the host CPU 11 in the node 20. The process shown in FIG. 9 can be repeatedly executed by the host CPU 11 whenever the communication controller 12 performs receiving processing on the receiving, and preceding and succeeding frames, and the reception status information (boundary violation information and frame state information) concerning the reception, preceding and succeeding slots is acquired.

Also in the node 20 in the second example, similar to the above-described node 10 in the first example, the reception status information concerning the reception, preceding and succeeding slots is first acquired. After this, in steps S201 to S218 shown in FIGS. 9A and 9B, the error factor of the boundary violation concerning the reception slot is identified, and, depending on the error type, it is determined whether the data of the receiving frame is to be used by an application of the node 20. Steps S201 to S218 shown in FIGS. 9A and 9B are not fully described since steps S201 to S218 are identical to steps S101 to S118 shown in FIGS. 7A and 7B.

After that in step S219, the host CPU 11 confirms the error type again. When the error type is "boundary exceeding of the receiving frame (type B)," "boundary exceeding of the preceding frame (type C)," or "boundary exceeding of the succeeding frame (type B)," the host CPU 11 determines that a synchronization shift occurs in the sender node of the frame in which the boundary exceeding occurs and transmits the synchronization-shift-reporting frame to the sender node in step S220.

In the communication network system according to embodiments described herein, each node on a network receives not only a frame in a reception slot but also frames in adjacent slots before and after the frame in the reception slot. In this way, the node can acquire reception status information concerning three slots, that is, the reception slot and two adjacent slots before and after the reception slot Based on the reception status information concerning the three slots, it is verified whether an error occurs in the reception slot and an error factor is verified. Therefore, according to the communication network system, the node on the network can appropriately determine whether an error occurs in the reception slot and the error factor For example, even if an error of boundary violation is detected in the reception slot, an appropriate response depending on the error factor can be performed such as if a receiving frame of a node has no malfunction, data of the receiving frame is used by an application of the node. Alternately, if it is determined that the receiving frame has a malfunction, the data is discarded. Thus, efficient communication can be realized.

In addition, according to the communication network system, each node on the network verifies an error factor of boundary violation in a reception slot, whereby a sender node of a frame in which a synchronization shift occurs can be identified. Thus, the occurrence of the synchronization shift can be reported to the sender node of the frame in which the synchronization shift occurs. By urging the sender node to perform an appropriate response, more efficient communication can be realized.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A communication network system for performing time-division-multiplexing communication in which a frame is received in a reception slot to be received by a node in a communication cycle including a data transfer period and an idle period, the communication network system comprising:
   a network; and
   a plurality of nodes coupled to the network; wherein at least one node of the plurality of nodes includes:
      a reception-status-information acquiring unit configured to acquire boundary violation information concerning a current frame received in a reception slot and a respective adjacent frame received in at least one adjacent slot adjacent to the reception slot and to acquire frame state information concerning each of the reception slot and the at least one adjacent slot, the boundary violation information indicating whether a signal is detected within the idle period between two adjacent slots and the frame state information including a reception status of a frame being normal or abnormal;
      an error-factor verifying unit configured to, when the boundary violation information for the reception slot indicates that the signal is detected within the idle period between the reception slot and a slot of the at least one adjacent slot, determine a cause of a boundary violation based on the boundary violation information and the frame state information, the cause selected from a group of causes including the current frame being located in part within the idle period, an adjacent frame being located in part within the idle period, and noise being located within the idle period; and
      a frame-use determining unit configured to determine whether data of the current frame is usable based on the cause of the boundary violation determined by the error-factor verifying unit and configured to use the current frame for control when the data of the current frame is usable.

2. The communication network system according to claim 1 wherein:
   the error-factor verifying unit is configured to specify which of a slot boundary between the reception slot and a preceding adjacent slot and a slot boundary between the reception slot and a succeeding adjacent slot at which the boundary violation occurs based on content of the boundary violation information concerning each of the adjacent slots when the signal is detected within the idle period; and the error-factor verifying unit is configured to specify a factor causing the boundary violation based on the frame state information concerning the reception slot and the frame state information concerning the reception slot and one of the adjacent slots between which the boundary violation occurs.

3. The communication network system according to claim 1 wherein:
   the frame-use determining unit is configured to conclude that the current frame is usable when the boundary violation information concerning the reception slot represents violation, the boundary violation information concerning a preceding slot adjacent to the reception slot represents violation, the frame state information concerning the reception slot represents normality, and the frame state information concerning the preceding slot represents abnormality.

4. The communication network system according to claim 1 wherein:
   the frame-use determining unit is configured to conclude that the current frame is usable when the boundary violation information concerning the reception slot represents violation, the boundary violation information concerning a succeeding slot adjacent to the reception slot represents violation, the frame state information concerning the reception slot represents normality, and the frame state information concerning the succeeding slot represents abnormality.

5. The communication network system according to claim 1 wherein:
   the frame-use determining unit is configured to conclude that the current frame is usable when the boundary violation information concerning the reception slot represents violation, the boundary violation information concerning a preceding slot adjacent to the reception slot represents violation, the frame state information concerning the reception slot represents normality, and the frame state information concerning the preceding slot adjacent to the reception slot represents normality.

6. The communication network system according to claim 1 wherein:
   the frame-use determining unit is configured to conclude that the current frame is usable when the boundary violation information concerning the reception slot represents violation, the boundary violation information concerning a succeeding slot adjacent to the reception slot represents violation, the frame state information concerning the reception slot represents normality, and the frame state information concerning the succeeding slot adjacent to the reception slot represents normality.

7. The communication network system according to claim 1 wherein:
   the frame state information is at least one of information indicating whether a valid frame has been received, information indicating whether a grammatically correct frame has been received, and information indicating whether a frame correct in content has been received.

8. The communication network system according to claim 1 wherein each of the plurality of nodes further comprises:
   a synchronization-shift-node determining unit configured to, based on output of the error-factor verifying unit, determine whether the signal was caused by a node in which a synchronization shift occurs the node being included in sender nodes of the current and any adjacent frames; and
   a synchronization-shift reporting unit configured to, when the synchronization-shift-node determining unit determines that the signal was caused by the node reports occurrence of the synchronization shift to the node in which the synchronization shift occurs.

9. A vehicle including the communication network system according to claim 1.

10. A communication network system for performing time-division-multiplexing communication in which a frame is received in a reception slot to be received by a node in a communication cycle including a data transfer period and an idle period, the communication network system comprising:
   a network; and
   a plurality of nodes connected to the network, wherein at least one node of the plurality of nodes comprises:
      a reception-status-information acquiring unit that acquires boundary violation information concerning frames received in each of three slots consisting of a reception slot, and preceding and succeeding slots adjacent to the reception slot, and frame state information concerning each of the reception slot and the preceding and succeeding slots, the boundary violation information indicating whether a signal is detected within the idle period between at least one of the reception slot and the preceding slot or the reception slot and the succeeding slot and the frame state information including a reception status of a frame being normal or abnormal;
      an error-factor verifying unit that verifies an error factor of the reception slot based on the boundary violation information and the frame state information, the error factor indicating a cause of the signal when the boundary violation information for the reception slot indicates that the signal is detected within the idle period, the cause selected from a group of causes including the current frame being located in part within the idle period, an adjacent frame being located in part within the idle period, and noise being located within the idle period; and
      a frame-use determining unit configured to, based on the error factor verified by the error-factor verifying unit, determine whether data of the current frame received in the reception slot is usable, and configured to use the current frame for control when the data of the current frame is usable.

11. A communication network system for performing time-division-multiplexing communication in which a frame is received in a reception slot to be received by a node in a communication cycle including a data transfer period and an idle period, the communication network system comprising:
   a network; and
   a plurality of nodes coupled to the network; wherein at least one node of the plurality of nodes includes:
      means for acquiring boundary violation information concerning a current frame received in a reception slot and a respective adjacent frame received in at least one adjacent slot adjacent to the reception slot and to acquire frame state information concerning each of the reception slot and the at least one adjacent slot, the boundary violation information indicating whether a signal is detected within the idle period between two adjacent slots and the frame state information including a reception status of a frame being normal or abnormal;
      means for, when the boundary violation information for the reception slot indicates that the signal is detected within the idle period between the reception slot and a slot of the at least one adjacent slot, determining a cause of a boundary violation based on the boundary violation information and the frame state information, the cause selected from a group of causes including the current frame being located in part within the idle period, an adjacent frame being located in part within the idle period, and noise being located within the idle period; and
      means for determining whether data of the current frame is usable based on the cause of the boundary violation determined by the verifying means and for using the current frame for control when the data of the current frame is usable.

12. A method for determining use of a received frame in at least one node among a plurality of nodes connected to a network, the method comprising:
   verifying an error factor of a reception slot received by the at least one node based on acquisition of boundary violation information and frame state information concerning a current frame received in the reception slot and respective frames received in at least one adjacent slot adjacent to the reception slot, the boundary violation information indicating whether a signal is detected within an idle period between two adjacent slots and the frame state information including a reception status of a frame being normal or abnormal; and
   determining whether data of the current frame received in the reception slot is usable by:
      concluding that the data of the current frame is usable when the boundary violation information for the reception slot indicates that the signal is not detected within the idle period between the reception slot and each adjacent slot; and
      concluding that the data of the current frame is usable when the boundary violation information concerning the reception slot indicates that the signal is detected within the idle period between the reception slot and at least one adjacent slot and the frame state information concerning the reception slot represents normality and the boundary violation information concerning the at least one adjacent slot indicates that the signal is detected.

13. The method according to claim 12, further comprising:
   specifying a slot boundary at which the boundary violation occurs based on content of the boundary violation information concerning each adjacent slot when the boundary violation information concerning the reception slot indicates that the signal is detected; and
   specifying a factor causing the boundary violation based on the frame state information concerning the reception slot and the frame state information concerning the reception slot and one of the adjacent slots between which the boundary violation occurs.

14. The method according to claim 12 wherein the at least one adjacent slot is a preceding slot adjacent to the reception slot, and the frame state information concerning the preceding slot represents abnormality.

15. The method according to claim 12 wherein the at least one adjacent slot is a succeeding slot adjacent to the reception slot, and the frame state information concerning the succeeding slot represents abnormality.

16. The method according to claim 12 wherein the at least one adjacent slot is a preceding slot adjacent to the reception slot, and the frame state information concerning the preceding slot adjacent to the reception slot represents normality.

17. The method according to claim 12 wherein the at least one adjacent slot is a succeeding slot adjacent to the reception slot, and the frame state information concerning the succeeding slot adjacent to the reception slot represents normality.

18. The method according to claim 12 wherein the frame state information is at least one of information indicating whether a valid frame has been received, information indicating whether a grammatically correct frame has been received, and information indicating whether a frame correct in content has been received.

19. The method according to claim 12, further comprising:
determining whether a node in which a synchronization shift occurs is detected; and
reporting occurrence of the synchronization shift to the node in which the synchronization shift occurs when the node in which the synchronization shift occurs is detected.

\* \* \* \* \*